United States Patent
Fallahi et al.

(10) Patent No.: US 7,207,700 B2
(45) Date of Patent: Apr. 24, 2007

(54) NEAR FIELD LENS WITH SPREAD CHARACTERISTICS

(75) Inventors: Amir P. Fallahi, West Bloomfield, MI (US); Jeffrey Allen Erion, Plymouth, MI (US); Jeyachandrabose Chinniah, Canton, MI (US); Edwin Mitchell Sayers, Saline, MI (US); Subramanian Narayanan, Belleville, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 36 days.

(21) Appl. No.: 11/233,125

(22) Filed: Sep. 22, 2005

(65) Prior Publication Data

US 2007/0064431 A1   Mar. 22, 2007

(51) Int. Cl.
*F21V 5/00* (2006.01)

(52) U.S. Cl. .................................................. 362/334

(58) Field of Classification Search ................ 362/333, 362/334, 335, 336, 338; 359/742, 743
See application file for complete search history.

(56) References Cited

U.S. PATENT DOCUMENTS

| | | | |
|---|---|---|---|
| 2,254,962 A | 9/1941 | Harris et al. | |
| 3,700,883 A | 10/1972 | Donohue et al. | |
| 4,704,661 A | 11/1987 | Kosmatka | |
| 4,859,043 A * | 8/1989 | Carel et al. | 359/742 |
| 5,122,903 A * | 6/1992 | Aoyama et al. | 359/565 |
| 5,160,192 A * | 11/1992 | Sugawara | 362/16 |
| 5,161,059 A | 11/1992 | Swanson et al. | |
| 5,208,701 A * | 5/1993 | Maeda | 359/574 |
| 5,532,909 A | 7/1996 | Ban et al. | |
| 5,577,492 A | 11/1996 | Parkyn, Jr. et al. | |
| 5,898,267 A | 4/1999 | McDermott | |
| 5,945,916 A * | 8/1999 | Collot | 340/815.4 |
| 6,113,251 A * | 9/2000 | Miyata | 362/333 |
| 6,123,440 A | 9/2000 | Albou | |
| 6,191,889 B1 | 2/2001 | Maruyama | |
| 6,206,554 B1 | 3/2001 | Schuster et al. | |
| 6,305,830 B1 | 10/2001 | Zwick et al. | |
| 6,454,443 B2 | 9/2002 | Natsume et al. | |
| 6,462,874 B1 | 10/2002 | Soskind | |
| 6,536,923 B1 * | 3/2003 | Merz | 362/327 |
| 6,547,423 B2 * | 4/2003 | Marshall et al. | 362/333 |
| 6,698,908 B2 | 3/2004 | Sitzema, Jr. et al. | |
| 6,724,543 B1 * | 4/2004 | Chinniah et al. | 359/718 |
| 6,726,346 B2 * | 4/2004 | Shoji | 362/328 |
| 6,755,556 B2 * | 6/2004 | Gasquet et al. | 362/329 |
| 6,807,019 B2 | 10/2004 | Takeuchi et al. | |
| 6,819,505 B1 | 11/2004 | Cassarly et al. | |
| 6,924,943 B2 * | 8/2005 | Minano et al. | 359/720 |

(Continued)

FOREIGN PATENT DOCUMENTS

DE          3317519 A1      11/1948

*Primary Examiner*—Ross Gushi
(74) *Attorney, Agent, or Firm*—Brinks Hofer Gilson & Lione

(57) ABSTRACT

A near field lens is for an automotive light assembly, generally comprising a central body positioned between opposing side bodies. The central body extends in a vertical direction, while the side bodies are positioned on horizontal sides of the central body. The opposing side bodies are structured to collimate the light both horizontally and vertically, while the central light body is structured to collimate the light vertically but not substantially collimate the light horizontally.

20 Claims, 4 Drawing Sheets

U.S. PATENT DOCUMENTS

| | | | |
|---|---|---|---|
| 6,974,236 B2 * | 12/2005 | Tenmyo | 362/340 |
| 7,006,306 B2 * | 2/2006 | Falicoff et al. | 359/800 |
| 7,083,313 B2 * | 8/2006 | Smith | 362/555 |
| 2002/0080615 A1 * | 6/2002 | Marshall et al. | 362/333 |
| 2003/0156417 A1 * | 8/2003 | Gasquet et al. | 362/329 |
| 2004/0218392 A1 | 11/2004 | Leadford | |
| 2005/0024744 A1 | 2/2005 | Falicoff et al. | |
| 2005/0078483 A1 | 4/2005 | Bernard et al. | |
| 2006/0061999 A1 * | 3/2006 | Sommers et al. | 362/335 |

* cited by examiner

NEAR FIELD LENS WITH SPREAD CHARACTERISTICS

FIELD OF THE INVENTION

The present invention relates generally to automotive light modules employing light emitting diodes, and more particularly relates to near field lens collecting and directing light from such light emitting diodes.

BACKGROUND OF THE INVENTION

Light emitting diodes (LED's) are fast becoming the preferable light source for automotive lighting applications, as they consume less power but provide light output which is acceptable for such applications. Near field lenses (NFL's) are used to collect as well as to collimate the light from a LED source, and generally provide high light collection efficiency (typically 70–90%). In the automotive field, particular functions or applications such as brake lights, turn lights, high-beam lights, low-beam lights, and many others, require particular beam patterns. Unfortunately, in order to provide a desired beam pattern using an LED and NFL, costly auxiliary devices and/or additional structures are required to distribute or otherwise spread the light for creation of the beam pattern. These structures can reduce the efficiency of the light module.

Accordingly, there exists a need to provide a NFL producing a desired beam pattern that reduces the dependence on additional light distribution devices.

BRIEF SUMMARY OF THE INVENTION

The present invention provides a near field lens capable of producing a beam pattern designed for certain automotive applications that reduces the dependence on additional light distribution devices. Generally, the near field lens is for a light assembly having a light source, the lens directing light outwardly along a longitudinal axis. The lens generally includes a central body positioned between opposing side bodies. The central body extends in a vertical direction, while the side bodies are positioned on horizontal sides of the central body. A pocket is defined by the central body and the opposing side bodies, and receives light from the light source. The opposing side bodies are structured to collimate the light both horizontally and vertically. The central body is structured to collimate the light vertically but not substantially collimate the light horizontally. In this manner, the central body provides some horizontal beam spread to the resulting beam pattern, without the need for any additional structures.

According to more detailed aspects, the central body and the opposing side bodies share a similar cross-sectional shape. The structure of the central body corresponds to a linear extrusion of the cross-sectional shape along the horizontal direction, while the structure of the opposing side bodies corresponds to a rotational extrusion of the cross-sectional shape about the longitudinal axis. The cross-sectional shape may correspond to various lens shapes. The horizontal width of the central body is sized to provide a horizontal beam spread meeting a desired automotive beam spread pattern.

According to still further detailed aspects, the central body includes an inner longitudinally facing surface and an inner radially facing surface. Both the inner longitudinally facing surface and the inner radially facing surface extend parallel to the horizontal axis of the lens. The central body further includes an outer radially facing surface that extends parallel to the horizontal axis of the lens. Each of the side bodies include an inner longitudinally facing surface and an inner radially facing surface, wherein the inner longitudinally facing surface and inner radially facing surface are curved relative to the horizontal axis of the lens. The pocket is defined by an inner longitudinally facing surface and an inner radially facing surface. The longitudinally facing surface is shaped as a lens focusing light longitudinally. The inner radially facing surface is curved to refract light towards an outer radially facing surface. The outer radially facing surface redirects light longitudinally.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
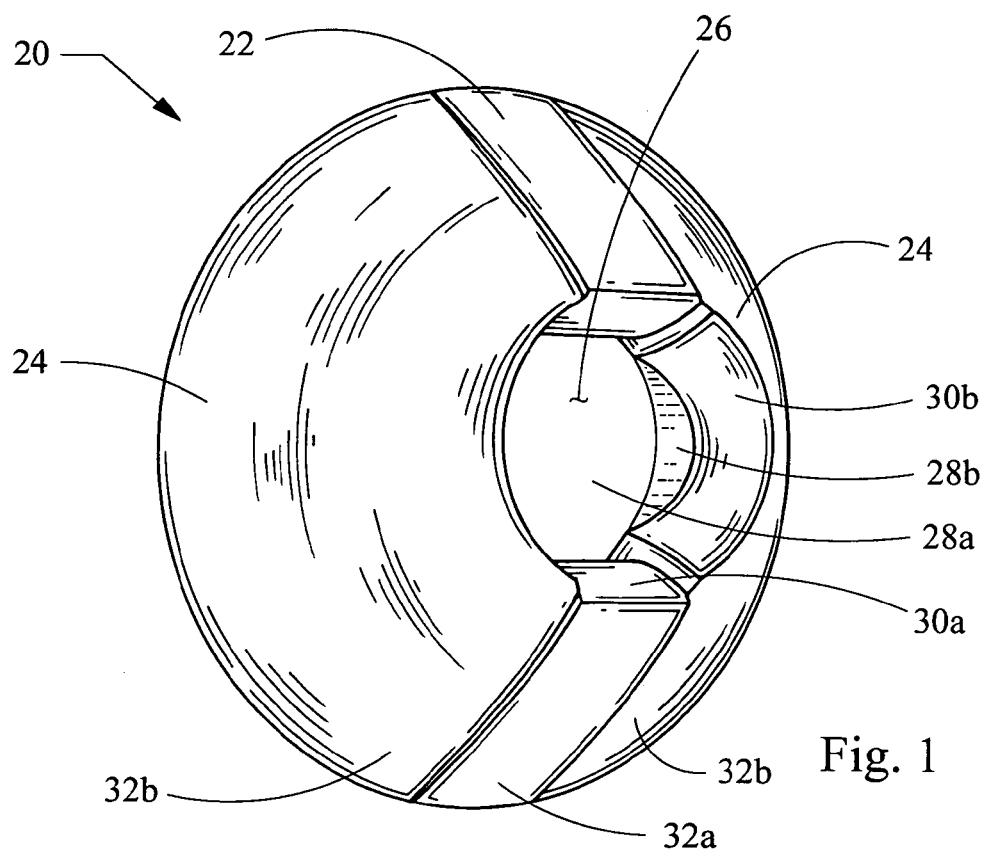
FIG. 1 is a perspective view of a near field lens constructed in accordance with the teachings of the present invention.

Turning now to the figures, FIG. 1 depicts a NFL 20 for an automotive lighting assembly having a light source such as an LED. While the lens of the present application is described in conjunction with the beam spread requirements of automotive functions or applications, it will be recognized by those skilled in the art that the lens may be employed outside of the automotive field and in any field which employs light emitting diodes or any other similar light source. A cross-sectional view of the lens 20 in FIG. 1 has been depicted in FIG. 5, which shows the lens 20 positioned adjacent a light source 12 for directing light outwardly along a longitudinal axis 10.

Figure 5:
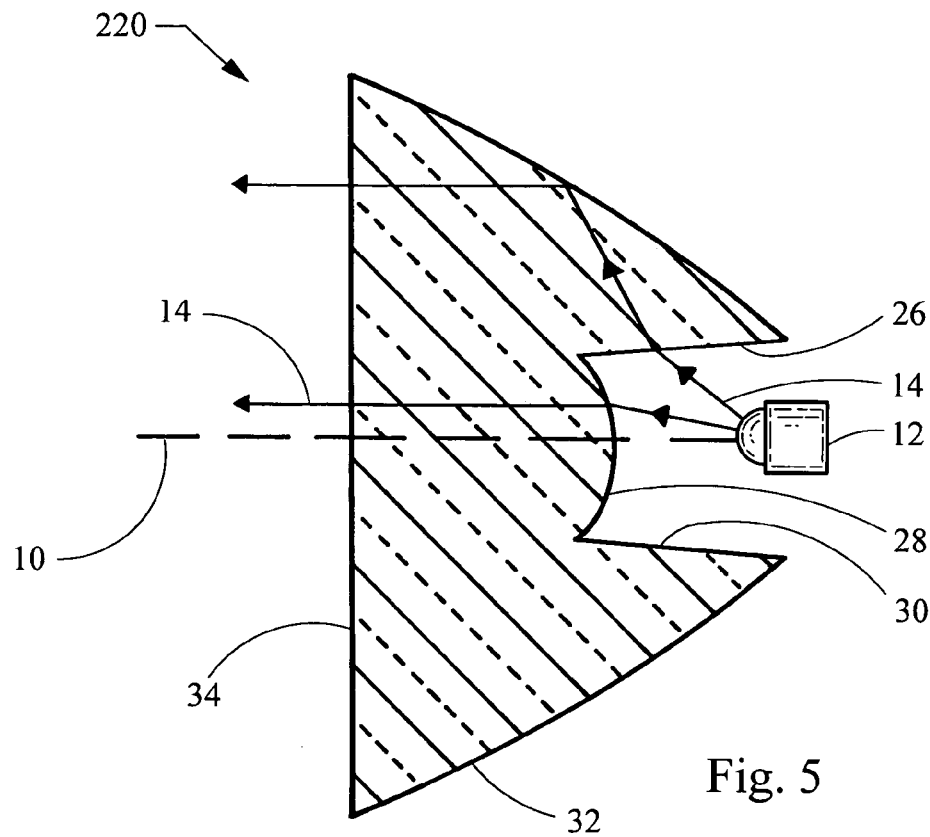
FIG. 5 is a cross-sectional view of the near field lens depicted in FIG. 1.

The lens 20 generally includes a central body 22 positioned between two opposing side bodies 24. The central body 22 extends in a vertical direction, while the side bodies 24 are positioned on horizontal sides of the central body 22. The central body 22 and side bodies 24 together define a pocket 26 which receives light from the light source 12. Both the central body 22 and the side bodies 24 are constructed of a common cross-section, which is depicted in FIG. 5. It can be seen that the light 14 generated from the light source 12 is collimated due to the structure of the lens 20. Particularly, the pocket 26 is defined by an inner longitudinally facing surface 28 and an inner radially facing surface 30. The longitudinally facing surface 28 is shaped as a lens to focus and vertically collimate the light 14 received at that surface. That is, the light 14 is refracted downstream out of an outer longitudinally facing surface 34. The inner radially facing surface 30 is structured to refract the light 14 outwardly towards an outer radially facing surface 32, which in turn is structured to vertically collimate the light 14 and reflect the light 14 longitudinally downstream and through the outer longitudinally facing surface 34.

Turning back to FIGS. 1 and 2, the central body 22 has a structure corresponding to a linear extrusion of the cross-sectional shape depicted in FIG. 5 along the horizontal direction. Each of the opposing side bodies 24 have a structure corresponding to a rotational extrusion of the cross-section shape depicted in FIG. 5 about the longitudinal axis 10. The resulting structures are best seen in the perspective views of FIGS. 1 and 2.

Figure 2:
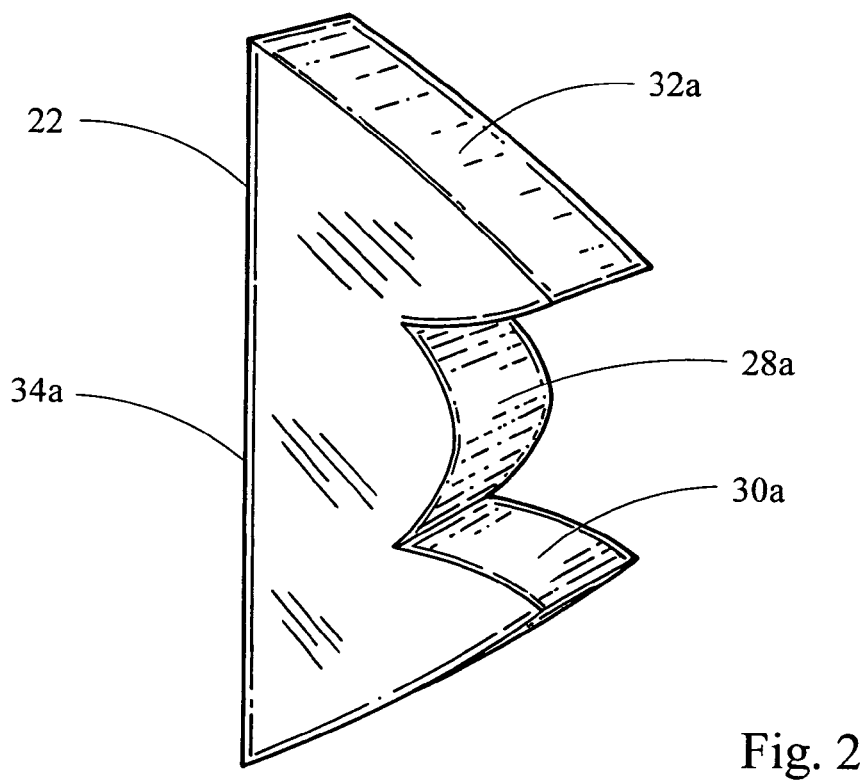
FIG. 2 is a perspective view of a central body forming a portion of the near field lens depicted in FIG. 1.

Specifically, the inner longitudinally facing surface 28 is formed in part by the central body 22, denoted as 28a in FIGS. 1 and 2, and also formed in part by the opposing side bodies 24, denoted as 28b in FIG. 1. Similarly, the inner radially facing surface 30 is formed in part by the central body 22, that portion denoted as 30a, and is formed in part by the opposing side bodies 24, denoted as 30b. As such, light striking the inner longitudinally facing surface 28a and inner radially facing surfaces 30a of the central body 22 are collimated vertically, but are not limited in terms of their horizontal spread. That is, the inner longitudinally facing surface 28a and inner radially facing surface 30a of the central body 22 extend parallel to a horizontal axis of the lens 20. Similarly, the outer radially facing surface 32a of the central body 22 extends parallel to the horizontal axis of the lens. However, the inner longitudinally facing surface 28b, and the radially facing surface 30b, and outer radially facing surface 32b are curved relative to the horizontal axis of the lens.

It can therefore be seen that the central body 22 is structured to collimate the light vertically but does not substantially collimate the light horizontally. On the other hand, the opposing side bodies 24, due to their curved shape, are structured to collimate the light both horizontally and vertically. Thus, the lens 20 formed by the combination of the central body 22 and the opposing side bodies 24 results in a beam pattern which has increased horizontal spread due to the structure of the central body 22. That is, the central body 22 provides a horizontal beam spread to the beam pattern that exceeds the horizontal beam width provided by the opposing side bodies 24.

Accordingly, it will be recognized by those skilled in the art that through use of the central body 22, the lens 20 may be constructed to meet certain automotive light functions such as stop lights, turn lights, high-beam lamps and CHMSL applications. In particular, the horizontal width of the central body 22 may be sized to provide a horizontal beam spread meeting the desired automotive beam spread pattern. Numerous variations of the lens 20 exist, as virtually any NFL design can modified through application of these teachings using the cross-section of such NFL's. It will also be recognized by those skilled in the art that the inner longitudinally facing surface 28 may be formed entirely by the surface 28a of the central body 22. Still further, the central body 22 can focus or partially collimate the light horizontally so long as some horizontal beam spread is provided. That is, the central body should not substantially collimate the light horizontally, meaning at least some horizontal beam spread is provided.

Figure 3:
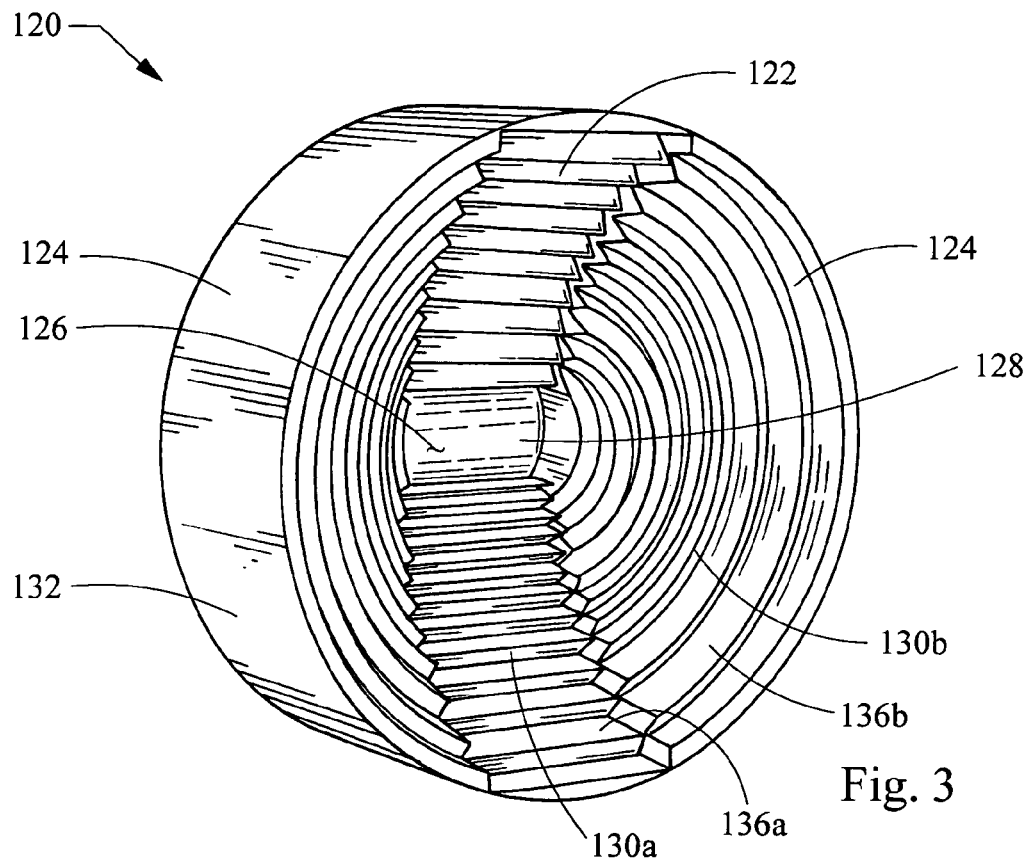
FIG. 3 is another embodiment of a near field lens construction in accordance with the teachings of the present invention.
Figure 4:
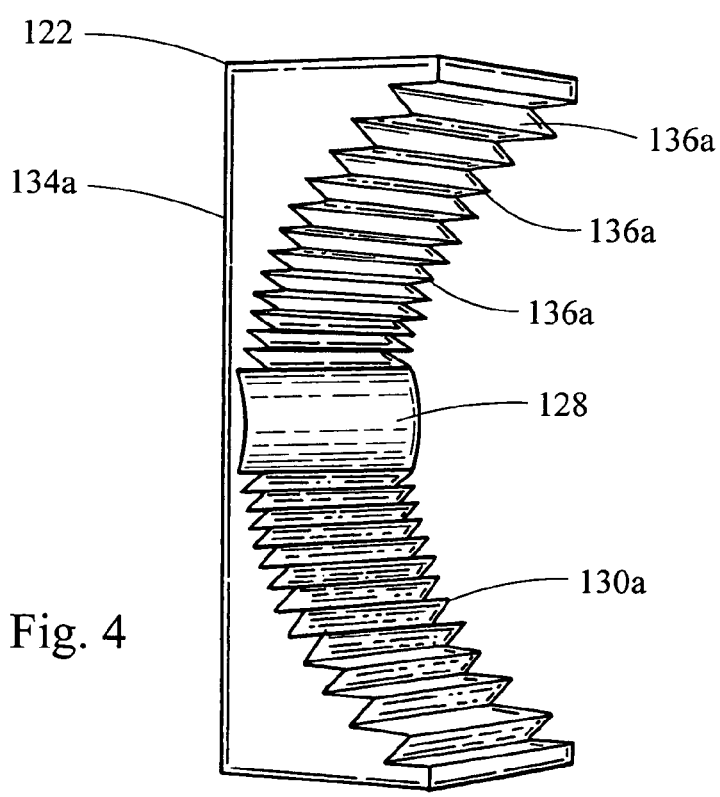
FIG. 4 is a perspective view of a central body forming a portion of the near field lens depicted in FIG. 3.
Figure 6:
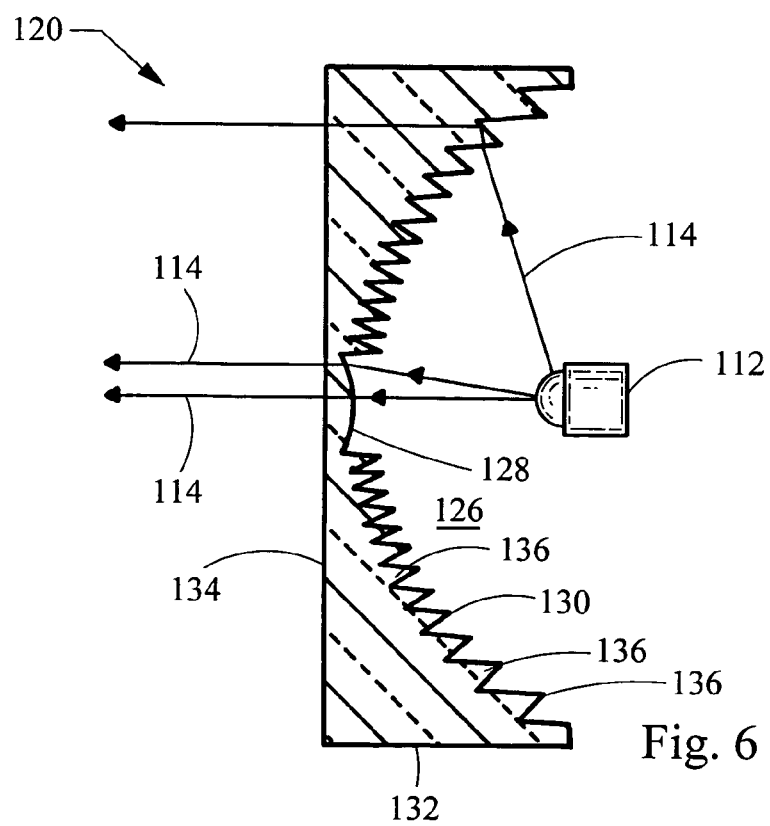
FIG. 6 is a cross-sectional view of the near field lens depicted in FIG. 3.

Turning now to FIGS. 3, 4 and 6, another embodiment of a near field lens 120 is depicted, this lens 120 structured on the design of a curved Fresnel lens. As with the prior embodiment, the lens 120 includes a central body 122 positioned between opposing side bodies 124. The central body 122 extends at a vertical direction while the side bodies 124 are positioned on horizontal sides of the central body 122. As best seen in FIG. 6, the lens 120 includes an inner longitudinally facing surface 128 and an inner radially facing surface 130 which in combination define a pocket 126 receiving light 114 from a light source 112. The inner longitudinally facings surface 128 is shaped as a lens such that light 114 passing through is focused and vertically collimated. The light 114 passes through a longitudinally facing surface 134 on its way downstream. The inner radially facing surface 130 is also constructed in accordance with a Fresnel lens design, namely with a series of angled ridges 136 as is known in the art. Thus, the central body 122 and opposing side bodies 124 share a common cross-sectional shape depicted in FIG. 6. The central body 122 and opposing side bodies 124 are united by a common outer radially facing surface 132, which here is flat cylinder as all of the light 114 is collected by the inner surfaces 128, 130.

As best seen in FIG. 4, the central body 122 has a structure corresponding to a linear extrusion of the cross-sectional shape depicted in FIG. 6 along the horizontal direction. The structure of each side body 124 corresponds to a rotational extrusion of the cross-sectional shape depicted in FIG. 6 about the longitudinal axis of the lens 120. Accordingly, the opposing side bodies are structured to collimate the light both horizontally and vertically, while the central body 122 is structured to collimate the light vertically, and not substantially horizontally, thus providing some horizontal beam spread. As best seen in FIG. 3, the inner longitudinally facing surface 128 is formed almost entirely by the central body 122 while the inner radially facing surface 130 is formed by both the central body 122, denoted as 130a, and by the side bodies 124, the surface denoted as 130b. Thus, all of the surfaces 130a, 130b include their own series of ridges 136a, 136b defining the Fresnel lens construction.

Figure 7:
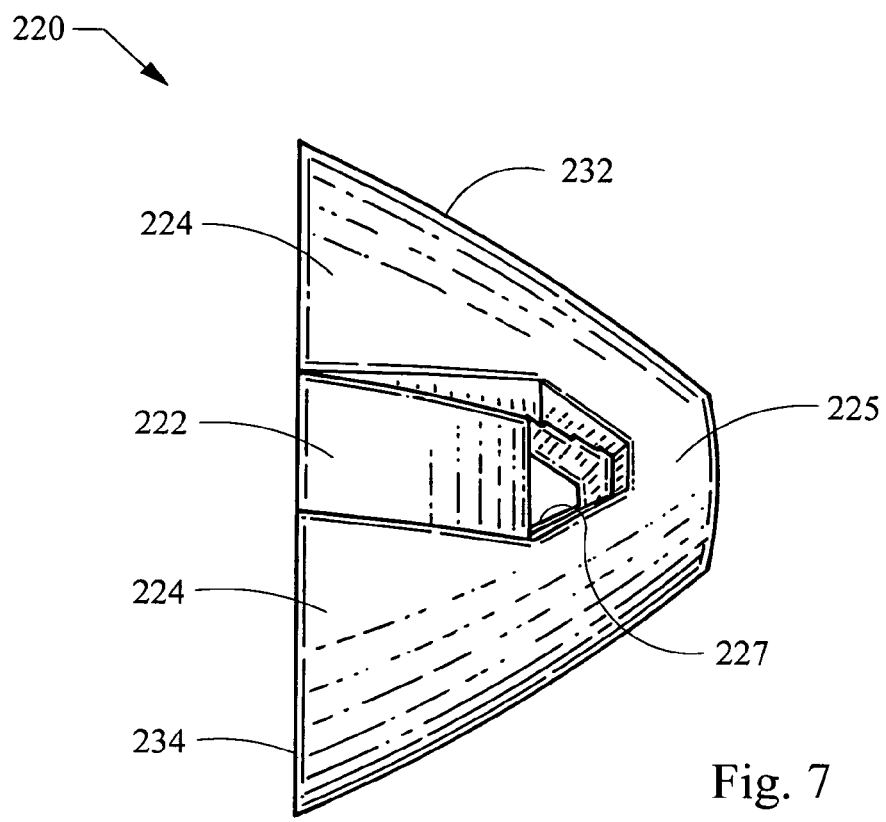
FIG. 7 is yet another embodiment of a near field lens constructed in accordance with the teachings of the present invention.
Figure 8:
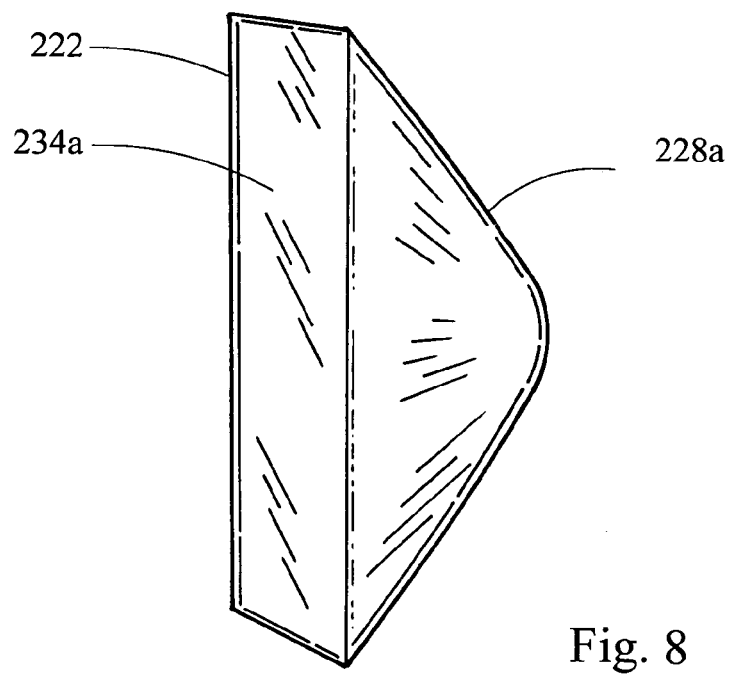
FIG. 8 is a perspective view of a central body forming a portion of the near field lens depicted in FIG. 7.

An alternate embodiment of a near field lens 220 constructed in accordance with the teachings of the invention has been depicted in FIGS. 7 and 8. As with the prior embodiments, the lens 220 includes a central body 222 positioned between opposing side bodies 224. The central body 222 extends in a vertical direction, while the side bodies 224 are on horizontal sides of the central body 222. Unlike the prior embodiments, here the side bodies 224 are joined by a central hub 225 on an upstream side of the lens 220. Although not shown, the central hub 225 defines a pocket receiving light from a light source having a construction similar to the pocket 26 shown in FIG. 1. Here, a slot is formed between the opposing side bodies 224 which is sized to receive the central body 222. An air gap 227 is left between the central hub 225 and the central body 222. The inner radially facing surfaces of the pocket in the hub 225 refract the light outwardly towards an outer radially facing surface 232, which in turn redirects the light longitudinally downstream out of an outer longitudinally facing surface 234. The light which is directed along the longitudinal axis by the pocket in the hub 225, is received by the central body 222. Specifically, the central body 222 includes an inner longitudinally facing surface 228a which receives the light and vertically collimates the light through refraction. The light exits the central body 222 at an outer longitudinally facing surface 234a which is coplanar with the outer surface 234 of the remainder of the lens 220, namely the outer longitudinal surface 234 of side bodies 224. Essentially, the structure of the central body 22 depicted in FIG. 2 and described as a first embodiment, has been split into two structures, namely the central body 222 and the central hub 225, which in combination serve to vertically collimate the light but permit some horizontal beam spread. That is, a central downstream portion of a NFL has been replaced with a structure that permits some horizontal beam spread while still collimating the light vertically.

It can therefore be seen that the near field lens 220 depicted in FIGS. 7 and 8 may comprise separately formed elements, namely the central hub 222 and separately formed side bodies 224 joined by hub 225, thereby facilitating manufacturability. As with both of the prior embodiments, the central body 222 may be sized, and in particular its horizontal width may be sized to provide a resulting beam pattern meeting certain automotive beam spread requirements.

Although the terms horizontal axis, horizontal direction, horizontally, vertical axis, vertical direction and vertically are used herein, it is understood that these terms merely indicate a relative direction and the NFL 20 can be oriented in any manner relative to the light source and the vehicle to which it is attached. For example, the NFL can be rotated 90 degrees such that the NFL 20 produces a beam pattern that provides increase spread in the vertical direction, and likewise the NFL 20 can be rotated at any degree depending on the particular application and the desired direction of increased beam spread. Accordingly, these terms are used in a non-limiting manner herein, and to avoid use of confusing first, second or third "directions" for clarity's sake.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A near field lens for an automotive light assembly having a light source, the lens directing light outwardly along a longitudinal axis, the lens comprising:
    a central body positioned between opposing side bodies, the central body extending in a vertical direction, the side bodies positioned on horizontal sides of the central body;
    a pocket defined at least one of the central body and the opposing side bodies, the pocket receiving light from the light source;
    the opposing side bodies structured to collimate the light both horizontally and vertically; and
    the central body structured to collimate the light vertically but not substantially collimate the light horizontally.

2. The lens of claim 1, wherein the cross-sectional shape corresponds to that of a Fresnel lens.

3. The lens of claim 1, wherein the central body includes an inner longitudinally facing surface and an inner radially facing surface, and wherein the inner longitudinally facing surface and an inner radially facing surface both extend parallel to a horizontal axis of the lens.

4. The lens of claim 1, wherein the central body includes an outer radially facing surface that extends parallel to a horizontal axis of the lens.

5. The lens of claim 1, wherein each of the side bodies includes an inner longitudinally facing surface and an inner radially facing surface, and wherein the inner longitudinally facing surface and inner radially facing surface are curved relative to a horizontal axis of the lens.

6. The lens of claim 1, wherein the horizontal width of the central body is sized to provide a horizontal beam spread meeting a desired automotive beam spread pattern.

7. The lens of claim 1, wherein the central body and the opposing side bodies share a similar cross-sectional shape.

8. The lens of claim 7, wherein the structure of the central body corresponds to an linear extrusion of the cross-sectional shape along the horizontal direction.

9. The lens of claim 7, wherein the structure of the opposing side bodies corresponds to a rotational extrusion of the cross-sectional shape about the longitudinal axis.

10. The lens of claim 1, wherein the pocket is defined by an inner longitudinally facing surface and an inner radially facing surface.

11. The lens of claim 10, wherein the inner longitudinally facing surface is shaped as a lens focusing light longitudinally.

12. The lens of claim 10, wherein the inner radially facing surface is structured as a Fresnel lens.

13. The lens of claim 10, wherein the inner radially facing surface includes a series of angled ribs.

14. The lens of claim 10, wherein the ribs formed on the central body extend parallel to the horizontal axis.

15. The lens of claim 10, wherein the inner radially facing surface is curved to refract light towards an outer radially facing surface.

16. The lens of claim 15, wherein the outer radially facing surface redirects light longitudinally.

17. The lens of claim 1, wherein the side bodies are joined by a central hub, the central hub position upstream of the central body.

18. The lens of claim 17, wherein the central body defines an inner longitudinally facing surface that is shaped to collimate the light vertically through refraction.

19. The lens of claim 17, wherein an air pocket is formed between the central hub and the central body.

20. A near field lens for an automotive light assembly having a light source, the lens directing light outwardly along a longitudinal axis in a beam pattern, the lens comprising:
    a central body positioned between opposing side bodies, the central body extending in a vertical direction, the side bodies positioned on horizontal sides of the central body;
    a pocket defined at least one of the central body and the opposing side bodies, the pocket receiving light from the light source;
    the opposing side bodies structured to collimate the light both horizontally and vertically; and
    the central body structured to collimate the light vertically and provide a horizontal beam spread to the beam pattern that exceeds the horizontal beam width provided by the opposing side bodies.

* * * * *